Sept. 5, 1944.　　　F. K. FLOYD　　　2,357,643
CALIBRATING APPARATUS
Filed Aug. 9, 1943　　　2 Sheets-Sheet 1
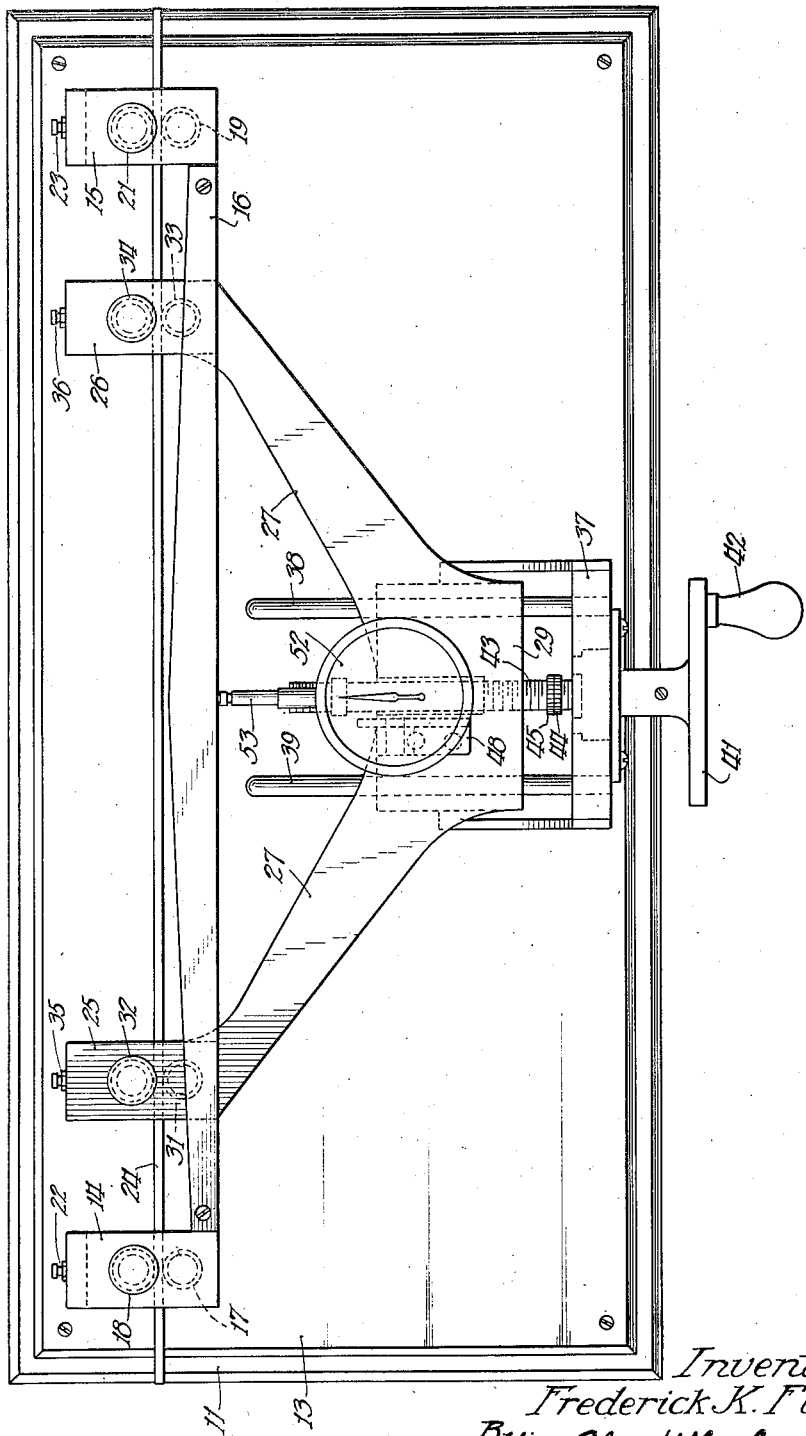
Inventor
Frederick K. Floyd
By Alois W. Graf　Atty.

Sept. 5, 1944. F. K. FLOYD 2,357,643
CALIBRATING APPARATUS
Filed Aug. 9, 1943 2 Sheets-Sheet 2
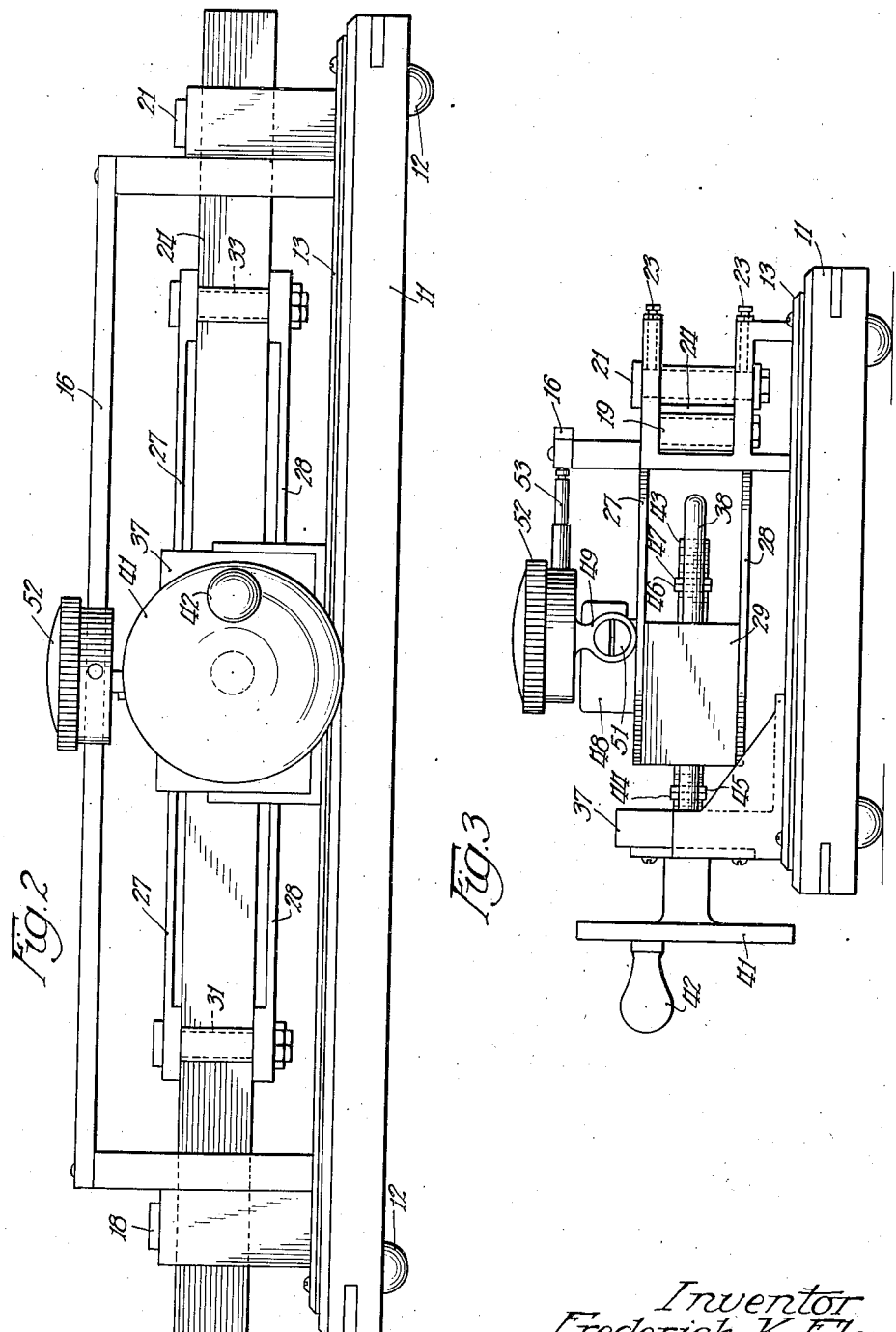
Inventor
Frederick K. Floyd.
By: Alois W. Graf Atty.

Patented Sept. 5, 1944

2,357,643

UNITED STATES PATENT OFFICE 2,357,643

CALIBRATING APPARATUS

Frederick K. Floyd, Denver, Colo., assignor to Hathaway Instrument Company, a corporation of Colorado Application August 9, 1943, Serial No. 497,895

6 Claims. (Cl. 265—1)

My invention relates to calibrating apparatus, and more particularly to a calibrating stand suitable for calibrating electrical resistance strain gauge units.

In strain gauge units of the resistance type, the unit is a small thin strip of about $\frac{3}{16}$ of an inch wide by $1\frac{1}{4}$ of an inch long and $6/1000$ of an inch thick made of a number of loops of wire having characteristics so as to change its resistance in accordance with the strain applied to the wire. Any one of a number of suitable wires may be utilized as for example Advance wire which is a nickel alloy. This wire which is about one-mill size is looped back and forth over the $1\frac{1}{4}$ inch length and connected to suitable lead wires. The wires are held in place on a flexible material such as fabric or paper and the strain gauge in use is held in place on the object in which the strain is to be measured by a cement which may be of any type such as De Khotinsky or Duco cement. The De Khotinsky cement is often used for quick applications which permit removal and reuse of the resistance strain gauge unit within a short time. Because such strain gauges have such small physical dimensions and the wires are looped back and forth, it, of course, will be apparent that in manufacture certain differences may be introduced between different gauge units even though considerable care is taken to maintain the manufacture of the units uniform. Therefore, it is necessary to calibrate each resistance strain gauge, and where balanced gauge units are used as is customary where it is desired to eliminate ambient temperature effects, the gauge units are matched. It is not sufficient merely to have the gauge units of equal electrical resistance initially, but they must also exhibit the same responses to applied strains. Therefore, in accordance with the present invention, there is provided a mechanism whereby one or a number of gauge units may be calibrated. Such a mechanism utilizes a straight metallic beam that is bent in such a way a uniform moment exists over a predetermined length of the beam so that gauges may be cemented to the beam at any point over this length and also that a plurality of gauges may be cemented thereto at a time. Means are provided to accurately indicate the deflection of the beam whereby calibration of the resistance unit may be obtained.

It is therefore an object of this invention to provide a new and improved calibrating stand suitable for the calibration of electrical resistance gauge strain units.

Still another object of the present invention is to provide an improved calibrating stand for electrical resistance gauge units whereby a metallic beam is bent in such a way that a uniform moment exists between two supports.

Other and further objects of this invention will subsequently become apparent, and the novel features thereof are defined in the appended claims. The invention itself together with other features thereof will be more readily understood by reference to the following description taken in connection with the accompanying drawings wherein Fig. 1 is a top view of the calibrating stand; Fig. 2 is a front view of the calibrating stand; and Fig. 3 is a right end view of the calibrating stand.

Referring to the figures of the drawings, it will be seen that there is provided a supporting base 11 which may be mounted on suitable resilient support members 12 located adjacent the corners of the support stand. The top of the support stand 11 is provided with a support plate 13 upon which is mounted the calibrating appaartus. Adjacent the back of the plate 13, there is provided at the left and right sides, a pair of fixed supports 14 and 15 which at their front edges are connected by a centrally reinforced rigid bar 16. The supports 14 and 15 are each provided with front and rear beam engaging members 17, 18, 19, and 21 respectively. The rear beam engaging members 18 and 21 of the supports 14 and 15 are arranged so as to be adjustable with respect to the front supporting members, and in order that this adjustment may be effected and retained, there are provided suitable adjusting apparatus 22 and 23 respectively which comprise a suitable lead screw or bolt and lock nut arrangement. Preferably each of the beam engaging members 17, 18, 19, and 21 are of such structure as to comprise cylindrically shaped surfaces or rollers retained in position with suitable bolt and nut fastening means so that a beam supported thereby may move relative thereto without undue friction or strain. A suitable metallic beam 24, therefore, is supported between the supporting members 17, 18, 19, and 21 and the beam 24 extends substantially the length of the base member 11.

The calibrating beam 24 is engaged at a short distance inwardly from the fixed supporting members 14 and 15 by movable supporting and engaging members 25 and 26 which are connected together by a pair of arms 27 and 28 to a central structure 29 which is arranged to be micrometrically adjusted by suitable cooperating apparatus positioned adjacent the front edge of the base plate 13. Each of the movable beam engaging portions 25 and 26 are provided with beam engaging apparatus 31, 32, 33 and 34 which are similar in structure to the beam engaging members 17, 18, 19, and 21 of the fixed supports 14 and 15. The rearward beam engaging members 32 and 34 are each arranged to be adjusted by suitable adjusting means 35 and 36 each of which may comprise an adjusting member and lock nut arrangement. Because the beam 24 is not fixed with respect to the supports 14, 15, 25 and 26 and because the movable supports 25 and 26 are spaced equally from the fixed supports 14 and 15, a deflection of the beam 24 will be such that a uniform moment exists between the two movable support members 25 and 26. The beam 24, therefore, has a surface extending between the movable support members which is suitable for the application by cement of one or more resistance gauge units. In the position shown in Fig. 1, the beam 24 is not subjected to any strain. Strain in small increments may be applied to the beam 24 by moving the central supporting structure 29 forwardly by a micrometric adjustment apparatus comprising a vertical supporting member 37 secured to the base plate 13 adjacent the central front portion thereof. The vertical support 37 is provided with two horizontal guide rods 38 and 39 which serve to support and guide the central movable beam engaging structure 29. The vertical support 37 supports a shaft to which there is attached a wheel 41 having a crank or handle 42. The rearward portion of the shaft to which the wheel and crank 41 and 42 are attached is provided with a threaded portion 43 which engages a suitably threaded opening in a centrally supported block portion 29 whereby this member will be moved forwardly and rearwardly upon movement of the crank 42. The threaded portion 43 of the actuating shaft and lead screw is provided at the front with a pair of lock nuts 44 and 45 and at the rear with a pair of lock nuts 46 and 47 so as to limit the movement of the movable beam engaging members. Immediately above the central portion 29 which interconnects the upper and lower arms 27 and 28 of the movable supports, there is provided a vertical member 48 to which there is fastened by a suitable supporting portion 49 and suitable fastening means such as a screw or stud portion 51, a dial indicating micrometer 52. The dial indicating micrometer is of a structure well-known in the art which has a spring urged movable contact member 53 the end of which engages the fixed beam 16 which interconnects the stationary supports 14 and 15. It, therefore will be seen that from the position shown in Fig. 1, the crank and wheel 42 and 41 may be actuated so as to move the movable beam engaging supports 25 and 26 toward the rear of the support plate 13. If the resistance gauge units have been cemented to the rear side of the beam 24, such movement will place the resistance units under a strain which then may be indicated and calibrated by suitable apparatus. If the wheel 41 and crank 42 are actuated so as to move the movable supporting members 25 and 26 towards the front of the base plate 13, resistance strain gauge units affixed to the rear of the beam 24 will then be subjected to a compression strain which also may be indicated and calibrated by suitable apparatus.

The calibrating apparatus shown in the accompanying drawings is used in conjunction with a source of power supplied to the strain gauge unit which is varied in resistance, and this change in the conductivity of the strain gauge unit is detected by an amplifier which supplies current to an oscillograph or other indicating meter to show the change which has taken place in the strain resistance gauge unit. The calibrating unit shown herein, therefore, is suitable for calibrating both the tension and the compression strains of a member as indicated by a strain unit. The strain unit having been calibrated may therefore be matched with other units where such units are to be used in pairs to compensate for the ambient temperatures of the member in which a strain is to be indicated or measured.

While a single embodiment of my invention has been shown and described, it is to be understood that variations in the arrangement and in the physical embodiments may be made without departing from the spirit and scope of my invention as set forth in the appended claims.

What is claimed is:

1. A device for calibrating resistance strain gauge units comprising a base, a pair of spaced apart fixed supports mounted thereon, a beam for supporting resistance strain gauge units, said beam being mounted on said supports so as to have longitudinal freedom, a pair of movable spaced apart support members engaging said beam between and adjacent said fixed supports, means for moving said movable supports in either of two horizontal directions to deflect said beam and to provide uniform moment stress in said beam between said movable support members, and means for indicating the deflection of said beam.

2. A calibrating instrument comprising a base, a pair of spaced apart supports secured to said base, a beam supported by said supports to provide longitudinal freedom of movement, micrometrically adjustable means mounted on said base so as to be on a line midway between said spaced apart supports, a pair of spaced apart movable support members for engaging said beam adjacent said first supports, said latter support members being moved by said adjustable means in either of two opposite horizontal directions to apply a force to bend said beam, and means for giving a relative indication of the force applied to said beam.

3. A device for calibrating resistance strain gauge units comprising a base having a pair of fixed supports, a horizontal beam for supporting resistance gauge units, said beam being mounted on said supports with longitudinal freedom, a pair of movable support members engaging said beam between said fixed supports, said movable support members being positioned symmetrically with respect to said fixed supports, means for moving said movable supports in either of two horizontal directions to deflect said beam, means to insure equal movement of said movable support members to provide uniform moment stress in said beam, and means for indicating the deflection of said beam.

4. An instrument for calibrating resistance strain gauge units comprising a beam loosely supported adjacent its ends by fixed support members, said beam having narrow edge surfaces and broad face surfaces whereby said beam has a narrow rectangular transverse cross section, said beam being mounted so that said broad face surfaces are vertical whereby resistance strain gauge units may be mounted thereon, means for applying equidistant from and between said fixed support members in either direction equal forces perpendicular to the beam face, and means for relatively indicating the deflection of said beam.

5. An instrument for use in calibrating resistance strain gauge units comprising a horizontal beam freely supported adjacent each end by a fixed support member, each fixed support member being provided with roller members for engaging the sides of said beam, means for applying equidistant from and between said fixed support members two equal forces perpendicular to the side of said beam, said means including beam engaging roller members, means for micrometrically moving said roller members in either of two horizontal directions, and means for indicating the amount of movement of said members in either direction.

6. An instrument for use in calibrating one or more resistance strain gauge units at a time comprising a horizontal beam supported adjacent each end by a fixed support member, said beam having narrow top and bottom surfaces and broad side surfaces, each fixed support member being provided with revolvable cylindrical members for engaging the sides of said beam, means for applying equidistant from and between said fixed support members two equal forces perpendicular to the side of said beam, said means including beam engaging revolvable cylindrical members supported by a pair of arms, means for micrometrically moving said arms in either of two horizontal directions, and spring-biased micrometer means for indicating the amount of movement of said arms.

FREDERICK K. FLOYD.